US012328541B2

(12) United States Patent
Staerke

(10) Patent No.: US 12,328,541 B2
(45) Date of Patent: Jun. 10, 2025

(54) EARPIECE RETENTION ASSEMBLY

(71) Applicant: N-ear ApS, Copenhagen V. (DK)

(72) Inventor: Mads Staerke, Solrod Strand (DK)

(73) Assignee: N-EAR APS, Copenhagen V. (DK)

( * ) Notice: Subject to any disclaimer, the term of this patent is extended or adjusted under 35 U.S.C. 154(b) by 432 days.

(21) Appl. No.: 17/745,034

(22) Filed: May 16, 2022

(65) Prior Publication Data

US 2022/0369016 A1 Nov. 17, 2022

Related U.S. Application Data

(60) Provisional application No. 63/188,847, filed on May 14, 2021.

(51) Int. Cl.
*H04R 1/10* (2006.01)

(52) U.S. Cl.
CPC ........... *H04R 1/1016* (2013.01); *H04R 1/105* (2013.01); *H04R 1/1066* (2013.01)

(58) Field of Classification Search
CPC ........ H04R 1/10; H04R 1/1016; H04R 1/105; H04R 1/1066; H04R 25/02; H04R 25/652; H04R 25/656; H04R 2225/025; H04R 2225/77
See application file for complete search history.

(56) References Cited

U.S. PATENT DOCUMENTS

| | | | | | |
|---|---|---|---|---|---|
| 2,939,923 | A * | 6/1960 | Henderson | H04R 25/652 | 381/328 |
| 3,915,166 | A * | 10/1975 | McCrink | A61F 11/08 | 128/866 |
| 5,757,944 | A * | 5/1998 | Jensen | H04R 1/08 | 379/430 |
| 6,449,374 | B1 * | 9/2002 | Skulley | H04R 1/083 | 381/381 |
| 6,785,396 | B2 * | 8/2004 | Shirata | H04R 1/105 | 381/381 |
| 7,221,771 | B1 * | 5/2007 | DeKalb | H04R 1/1066 | 381/384 |
| 7,841,446 | B2 * | 11/2010 | Leong | A61F 11/08 | 381/328 |
| 8,818,012 | B2 * | 8/2014 | Pelland | H04R 1/1075 | 381/381 |
| 9,319,769 | B2 * | 4/2016 | Burgett | H04R 1/105 | |
| 10,231,048 | B2 * | 3/2019 | Smith | H04R 1/1066 | |
| 10,687,138 | B2 * | 6/2020 | Mainini | H04R 3/12 | |
| 11,665,490 | B2 * | 5/2023 | Gundlach | H04R 25/652 | 381/324 |
| 2008/0298626 | A1 * | 12/2008 | Dean | H04R 1/1058 | 381/381 |

(Continued)

FOREIGN PATENT DOCUMENTS

| | | | | |
|---|---|---|---|---|
| DE | 10139865 B4 * | 2/2006 | H04M 1/05 |
| EP | 2277321 B1 * | 8/2015 | H04R 1/10 |
| WO | WO-2005067654 A2 * | 7/2005 | H04R 1/086 |

*Primary Examiner* — Ryan Robinson
(74) *Attorney, Agent, or Firm* — Heath M. Sargeant; Charles A. Weiss; Holland & Knight LLP

(57) ABSTRACT

An earpiece retention assembly may include a cable portion pre-formed into an ear loop with a first end coupled to a non-insertion end of an earpiece. The cable portion may be configured to bias the earpiece toward the interior of the ear loop to define a default orientation.

16 Claims, 13 Drawing Sheets

(56) References Cited

U.S. PATENT DOCUMENTS

| | | | | |
|---|---|---|---|---|
| 2014/0105438 | A1* | 4/2014 | Fretz | H04R 25/02 381/328 |
| 2015/0013112 | A1* | 1/2015 | Jiang | H04R 1/105 24/3.1 |

* cited by examiner

EARPIECE RETENTION ASSEMBLY

RELATED APPLICATIONS

This application claims the benefit of U.S. Provisional Application No. 63/188,847, filed on 14 May 2021; the contents of which are incorporated herein by reference.

TECHNICAL FIELD

The present disclosure generally relates to earpieces and, more particularly, to earpiece retention assemblies.

BACKGROUND

Earpieces are useful for hearing protection and communication. For example, earpieces may be used to suppress certain sounds, audible frequency bands, or audible frequency functions; enhance certain sounds, audible frequency bands, or audible frequency functions; enable communication with electronic devices, etc. However, securing earpieces adjacent to an ear canal or partially within the ear canal can result in an uncomfortable fit and/or side-of-head-specific earpiece assemblies. For example, conventional earpiece retention devices typically require custom fitting to an individual ear and/or additional components or shaping specific to a particular ear or side (i.e., a left ear or a right ear). As such, conventional earpiece retention devices may be limited for use in one ear (i.e., a left ear or a right ear) and/or may include ear clips or other features that uncomfortably retain an earpiece adjacent to or partially within an ear canal.

SUMMARY

In an embodiment, an earpiece retention assembly may include a cable portion pre-formed into an ear loop with a first end coupled to a non-insertion end of an earpiece. The cable portion may be configured to bias the earpiece toward the interior of the ear loop, thus defining a default orientation.

One or more of the following features may be included. The earpiece may be configured to be twisted from the default orientation for insertion into an ear canal, thus defining an insertion orientation. A biasing force between the cable portion and the non-insertion end of the earpiece may be configured to bias the earpiece from the insertion orientation toward the default orientation. The biasing force between the cable portion and the non-insertion end of the earpiece may be configured to retain the earpiece within the ear canal when the earpiece is at least partially inserted into the ear canal. The earpiece may be configured to be twisted from the default orientation for insertion into the ear canal of either ear. The earpiece may be configured to be twisted from the default orientation to an angle ranging from about zero degrees to about one hundred eighty degrees relative to the default orientation when inserting the earpiece into the ear canal of a left ear. The earpiece may be configured to be twisted from the default orientation to an angle ranging from about zero degrees to about negative one hundred eighty degrees relative to the default orientation for insertion into the ear canal of a right ear. A second end of the cable portion may be configured to be coupled to an electronic device. The cable portion includes one or more wires encased in an exterior tubing.

According to another embodiment, an earpiece retention assembly may include a cable portion pre-formed into an ear loop with a first end coupled to a non-insertion end of an electronic earpiece. The cable portion may be configured to elastically bias the electronic earpiece into an orientation substantially parallel to the cable portion when the cable portion is looped over an ear, thus defining a default orientation.

One or more of the following features may be included. The electronic earpiece may be configured to be twisted from the default orientation for insertion into an ear canal, thus defining an insertion orientation. An elastic biasing force between the cable portion and the non-insertion end of the electronic earpiece may be configured to elastically bias the electronic earpiece from the insertion orientation toward the default orientation. The elastic biasing force between the cable portion and the non-insertion end of the electronic earpiece may be configured to retain the electronic earpiece within the ear canal when the electronic earpiece is at least partially inserted into the ear canal. The electronic earpiece may be configured to be twisted from the default orientation for insertion into the ear canal of either ear. The electronic earpiece may be configured to be twisted from the default orientation to an angle ranging from about zero degrees to about one hundred eighty degrees relative to the default orientation when inserting the earpiece into the ear canal of a left ear. The electronic earpiece may be configured to be twisted from the default orientation to an angle ranging from about zero degrees to about negative one hundred eighty degrees relative to the default orientation for insertion into the ear canal of a right ear. A second end of the cable portion may be configured to be coupled to an electronic device. The cable portion may include one or more wires encased in an exterior tubing.

According to yet another embodiment, a method for producing an earpiece retention assembly may include forming a cable portion into an ear loop. The cable portion may be heated at a predefined temperature for a predefined period of time. In one example, the cable portion may be heated at about 80° Celsius for about 20 minutes. A non-insertion end of an earpiece may be coupled to a first end of the cable portion such that the earpiece is elastically biased toward the interior of the ear loop.

One or more of the following features may be included. The cable portion may include one or more wires encased in an exterior tubing.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

Figure 1:
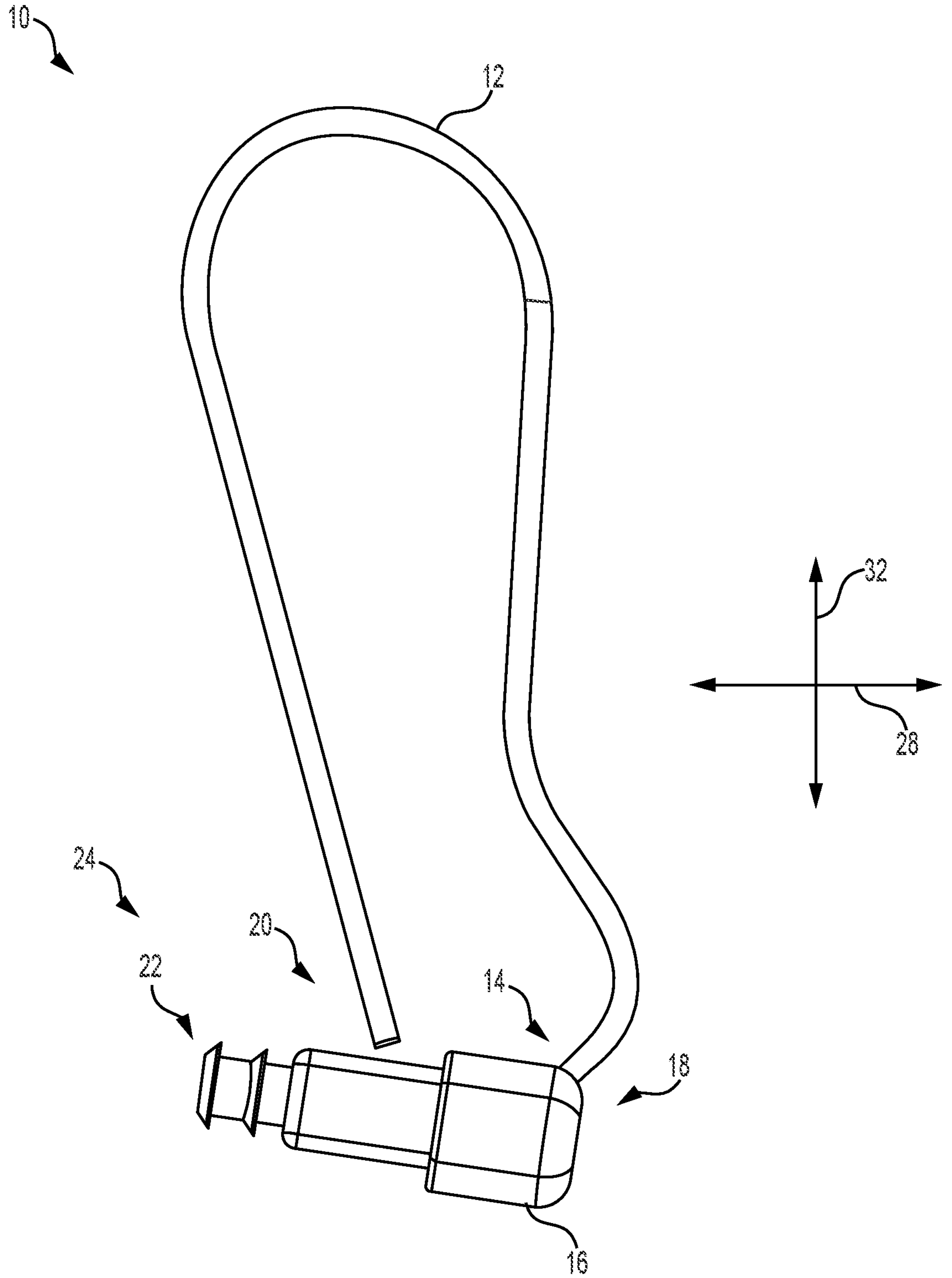
FIG. 1 is a perspective view of an earpiece retention assembly, according to an example embodiment.

In general, consistent with the present disclosure, a universal earpiece retention assembly is provided for retaining earpieces within a user's ear; either a left ear or a right ear. For example, and referring generally to FIGS. 1-13, in some implementations, earpieces may generally include electronic components configured to suppress certain sounds, audible frequency bands, or audible frequency functions; enhance certain sounds, audible frequency bands, or audible frequency functions; enable communication with electronic devices, etc. Earpieces are typically secured within an ear canal by having a particular shape that conforms to the ear canal and/or by including various features that wrap or bend around a user's ear. However, these conventional earpieces or earpiece retention devices are ear-specific (e.g., for a particular ear shape, for a particular ear (e.g., left ear or right ear), etc.) or require additional features to secure the earpiece within the ear canal (e.g., ear clips, ear hooks, etc.).

As will be described in greater detail below, a universal earpiece retention assembly may include, but is not limited to, a cable portion pre-formed into an ear loop with a first end coupled to a non-insertion end of an earpiece. The cable portion may be configured to bias the earpiece toward the interior of the ear loop to define a default orientation. Embodiments of the present disclosure may provide a universal (i.e., adaptable to either ear) earpiece retention assembly that comfortably retains an earpiece within a user's ear. In this manner and consistent with the present disclosure, earpieces may be used in either ear and retained with only the twisting or biasing force of the cable portion. Accordingly and in contrast to conventional earpiece retention devices, generic earpieces may be utilized without requiring custom fitting to a user's ear and without additional components or shaping specific to a particular ear (i.e., a left ear or a right ear).

Referring to FIGS. 1-13 and in some implementations, a universal earpiece retention assembly (e.g., earpiece retention assembly 10) may include a cable portion pre-formed into an ear loop with a first end coupled to a non-insertion end of an earpiece. A cable portion (e.g., cable portion 12) may generally include a segment or length of cable with one or more wires encased in an exterior tubing. The exterior tubing may include any organic coating, polymeric coating, thermoplastic coating, or any other type of coating configured to insulate wires within the cable from external exposure. In some implementations, cable portion 12 may include electromagnetic shielding and/or other wire insulation. Cable portion 12 may include one or more reinforcing materials. In one example, cable portion 12 may include e.g., aramid fibers running the length of cable portion 12 within the insulation of the one or more wires. In one example, Kevlar® fibers may be included within and extend at least partially along the length of cable portion 12. While an example of e.g., Kevlar® has been provided for a reinforcing material, it will be appreciated that any aramid fiber or other material may be used to reinforce cable portion 12 within the scope of the present disclosure.

In some implementations, cable portion 12 may be preformed into an ear loop. As will be discussed in greater detail below and in contrast to conventional earpiece assemblies, earpiece retention assembly 10 may be configured to utilize a universal ear loop to allow earpiece retention assembly 10 to be used in either ear (e.g., a left ear or a right ear). In this manner, earpiece retention assembly 10 may be adapted for either ear.

Cable portion 12 may be pre-formed into an ear loop shape (or any shape) by heating cable portion 12 in a particular shape for a predefined period time at a particular temperature (or range of temperatures) to impart elastic properties to cable portion 12. During the heating and subsequent cooling process, cable portion 12 may develop elastic properties where cable portion 12 has a default shape (i.e., the pre-formed shape of cable portion 12) and, when a force is applied to cable portion 12, cable portion 12 may produce an opposing force to elastically revert cable portion 12 back to the default shape.

In some implementations, cable portion 12 may be preformed into an ear loop with a first end (e.g., first end 14) coupled to a non-insertion end of an earpiece (e.g., earpiece 16). An electronic earpiece may include an electrical component configured to be inserted at least partially into an ear canal and configured to perform various auditory operations such as sound amplification, sound attenuation, communication (e.g., as part of a radio system), noise filtering, etc. However, it will be appreciated that non-electronic earpieces may be coupled to first end 14 of cable portion 12 within the scope of the present disclosure. For example, an ear plug or other passive earpiece may be coupled to first end 14 of cable portion 12. In some implementations, the earpiece (e.g., earpiece 16) may include a non-insertion end (e.g., non-insertion end 18 of earpiece 16). Non-insertion end 18 may generally include the end or portion of earpiece 16 that is not inserted into an ear canal. In this manner, non-insertion end 18 may be an externally facing or exposed end of earpiece 16 when earpiece 16 is at least partially inserted into an ear canal.

In some implementations, a second end of the cable portion may be configured to be coupled to an electronic device. As discussed above and in some implementations, earpiece 16 may be at least a portion of an electronic communication system. For example, earpiece 16 may be a portion of a headphone assembly that includes one or more speakers configured to generate sound signals. Earpiece 16 may be electronically coupled via cable portion 12 to a radio system or other sound signal source. In this manner, earpiece 16 may provide sound signals from the electronic device (e.g., a radio, a computing device, etc.) to an ear canal (or adjacent to the ear canal). Accordingly, second end 20 of cable portion 12 may include an adapter for coupling to an electronic device (e.g., a 3.5 millimeter adapter, a 2.5 millimeter adapter, etc.). It will be appreciated that second end 20 of cable portion 12 may include any type of adapter for coupling to an electronic device within the scope of the present disclosure.

In some implementations, the cable portion may be configured to bias the earpiece toward the interior of the ear loop, thus defining a default orientation. As discussed above and in some implementations, cable portion 12 may be pre-formed (i.e., heated and shaped) into an ear loop such that cable portion 12 develops elastic properties where cable portion 12 has a default shape (i.e., the shape of cable portion 12 when no rotational or twisting force is applied to cable portion 12) and, when a rotational force is applied to cable portion 12, cable portion 12 may produce an opposing rotational force to elastically bias cable portion 12 back to the default shape. Referring also to FIG. 1 and in some implementations, earpiece 16 may be coupled to first end 14 of cable portion 12 such that earpiece 16 is oriented toward the interior of the ear loop formed by cable portion 12. As shown in FIG. 1, earpiece 16 may be oriented such that an insertable end (e.g., insertable end 22) of earpiece 16 is oriented toward the interior of the ear loop formed by cable portion 12.

Figure 2:
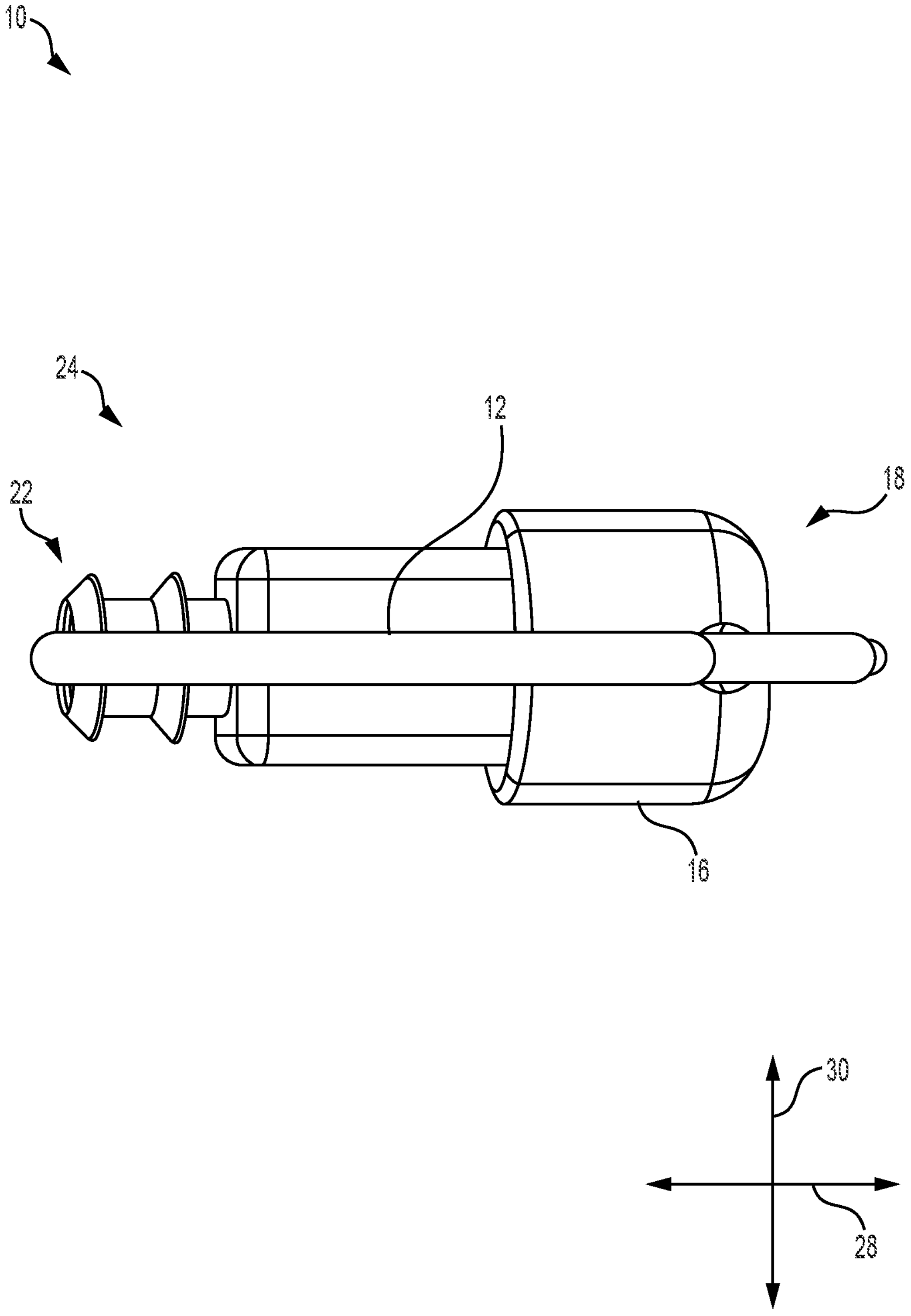
FIG. 2 is a top view of the earpiece retention assembly of FIG. 1, according to an example embodiment.

In some implementations, biasing earpiece 16 toward the interior of the ear loop defined by cable portion 12 may include biasing earpiece 16 into an orientation substantially parallel to the cable portion when the cable portion is looped over an ear, thus defining a default orientation (e.g., default orientation 24). Referring also to FIG. 2 which is a top view of earpiece retention assembly 10 as shown in FIG. 1, cable portion 12 may bias earpiece 16 into an orientation substantially parallel to the top of the ear loop formed by cable portion (e.g., default orientation 24). As shown in FIGS. 1-2, cable portion 12 may define an ear loop extending along axis 26. Accordingly, cable portion 12 may bias earpiece 16 substantially parallel to the ear loop formed by cable portion 12 extending along axis 26. In this manner, earpiece 16 may be biased in an orientation substantially parallel to the cable portion looped over the top of an ear (i.e., parallel with the ear loop defined by cable portion 12). While FIG. 2 shows earpiece 16 exactly parallel with the ear loop formed by cable portion 12, it will be appreciated that earpiece 16 may be oriented or biased substantially parallel to the ear loop formed by cable portion 12 within the scope of the present disclosure. In some implementations, substantially parallel may include a range of +/−30° variability in any direction (e.g., along axis 28, axis 30, and/or axis 32) within the scope of the present disclosure.

Figure 3:
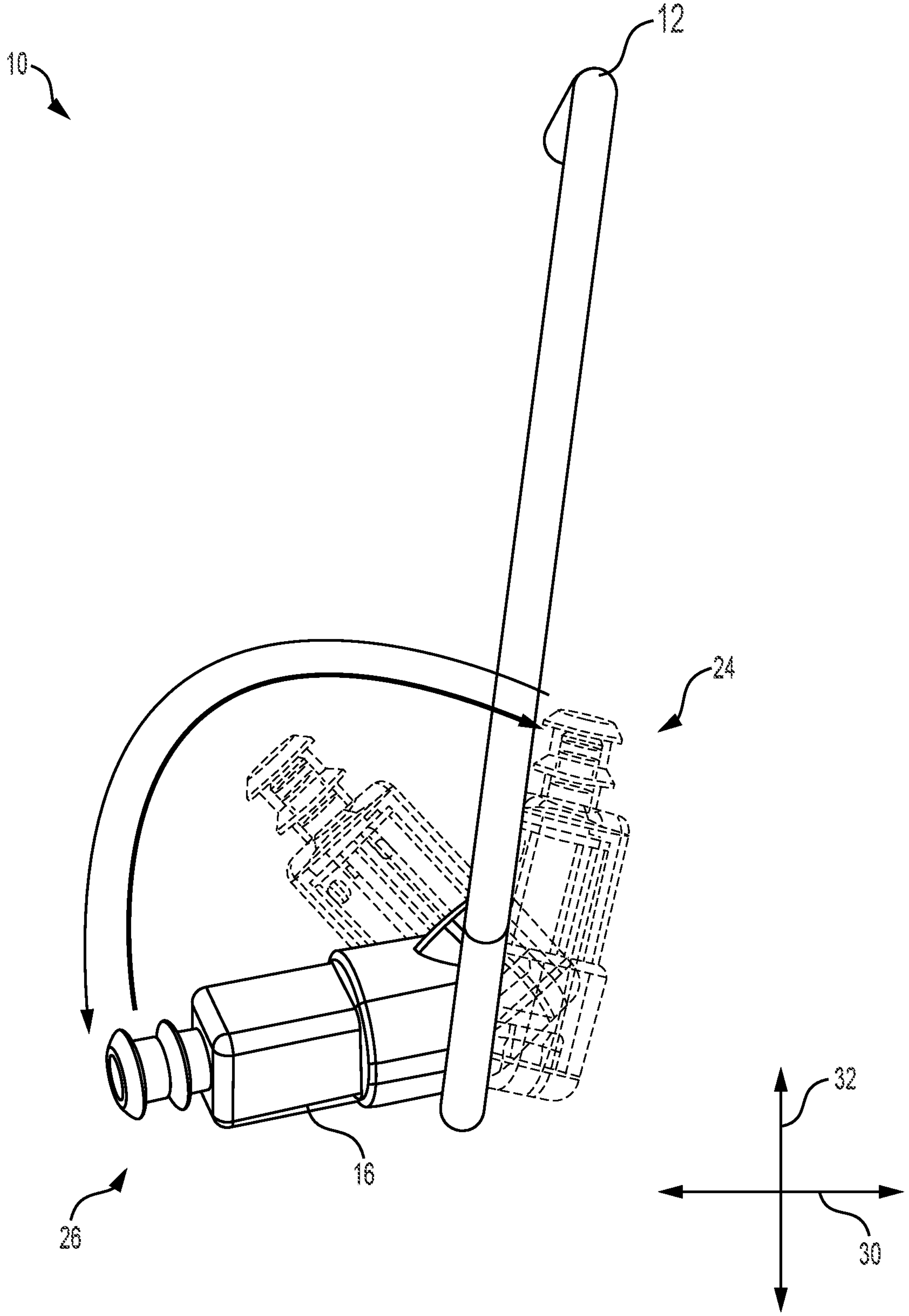
FIG. 3 is a perspective view of the default and insertion orientations an earpiece may be twisted into according to an example embodiment.
Figure 4:
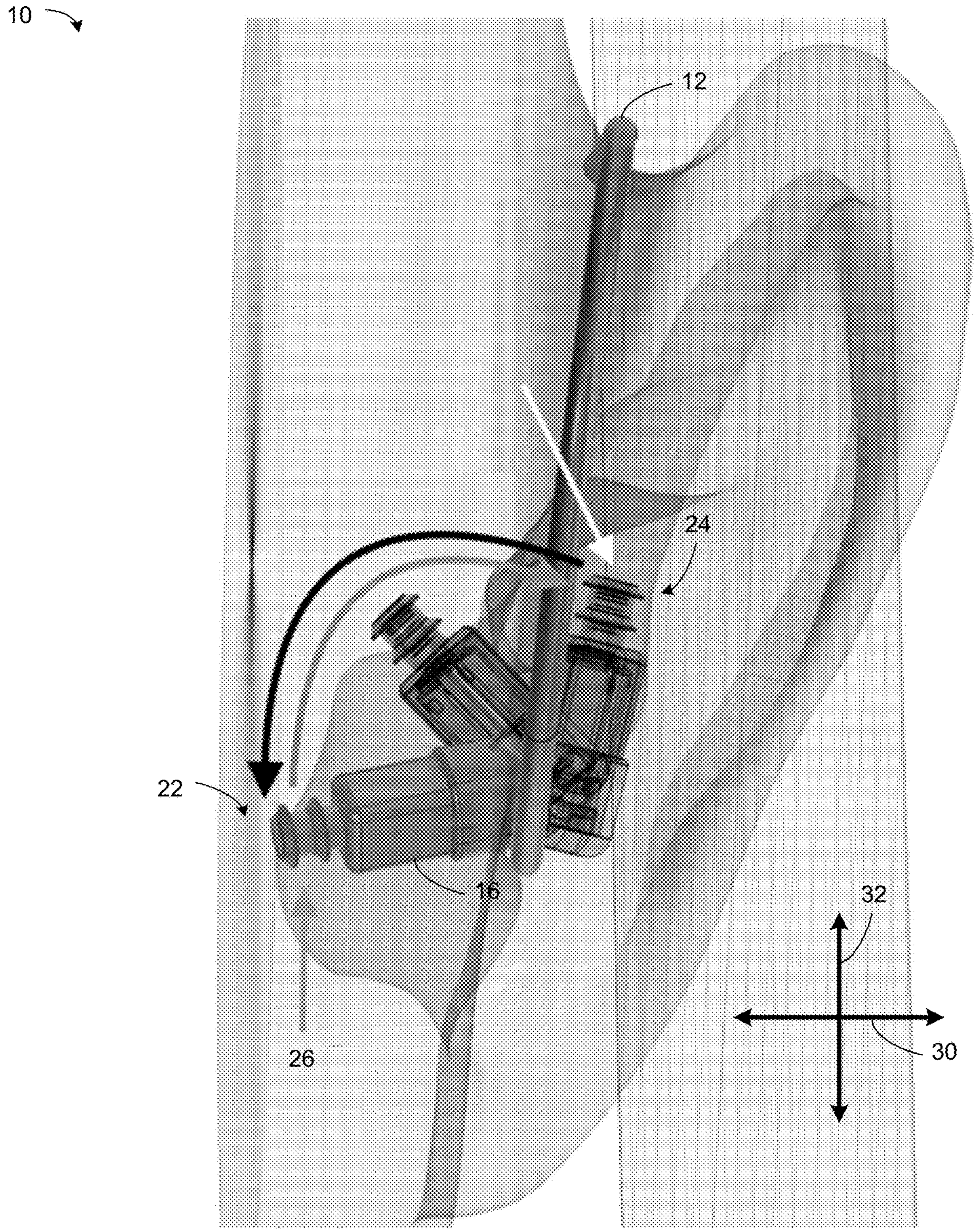
FIGS. 4-5 are perspective views of the default and insertion orientations an earpiece may be twisted into for insertion into an ear canal according to various example embodiments.
Figure 5:
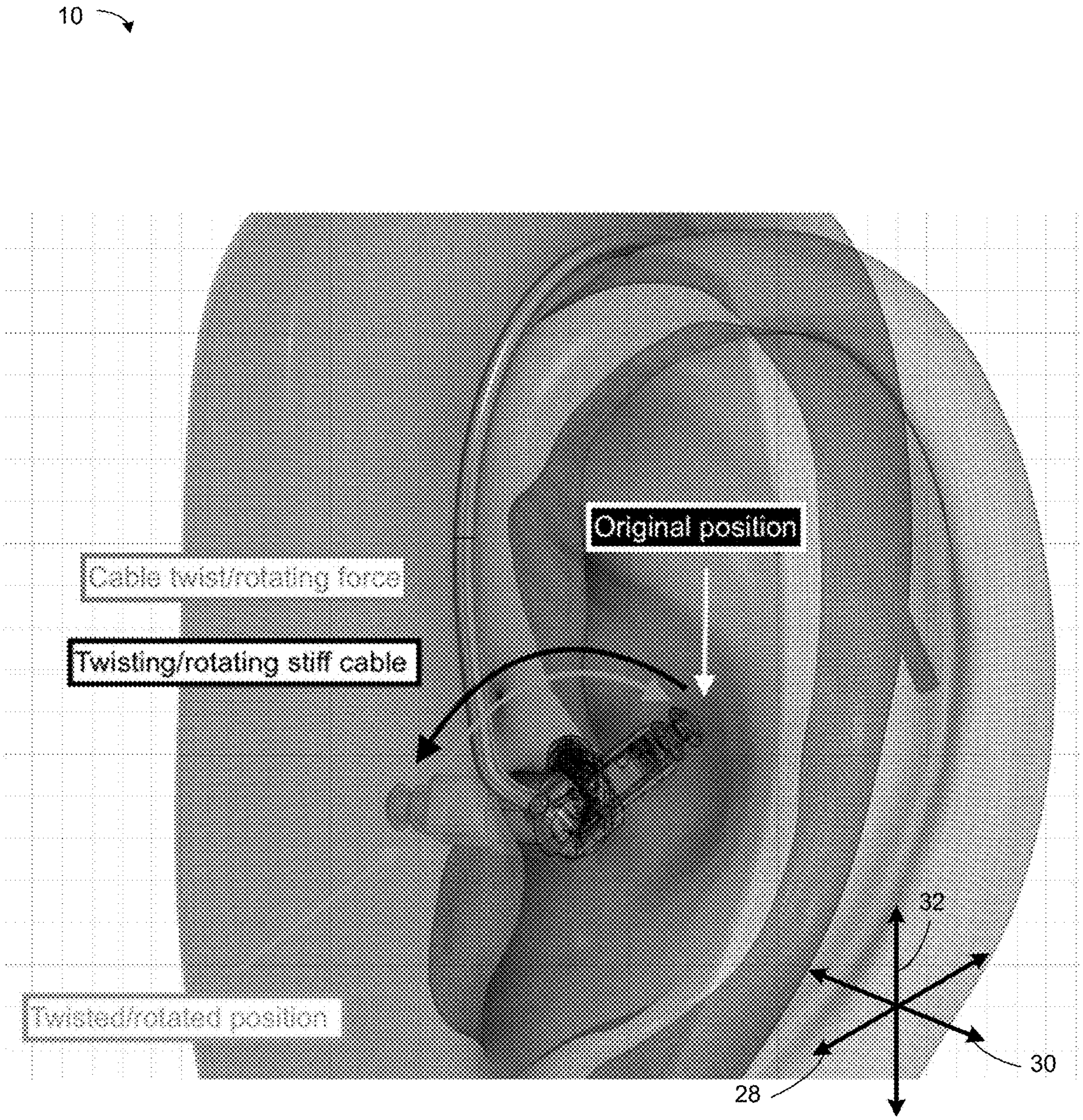
Figure 6:
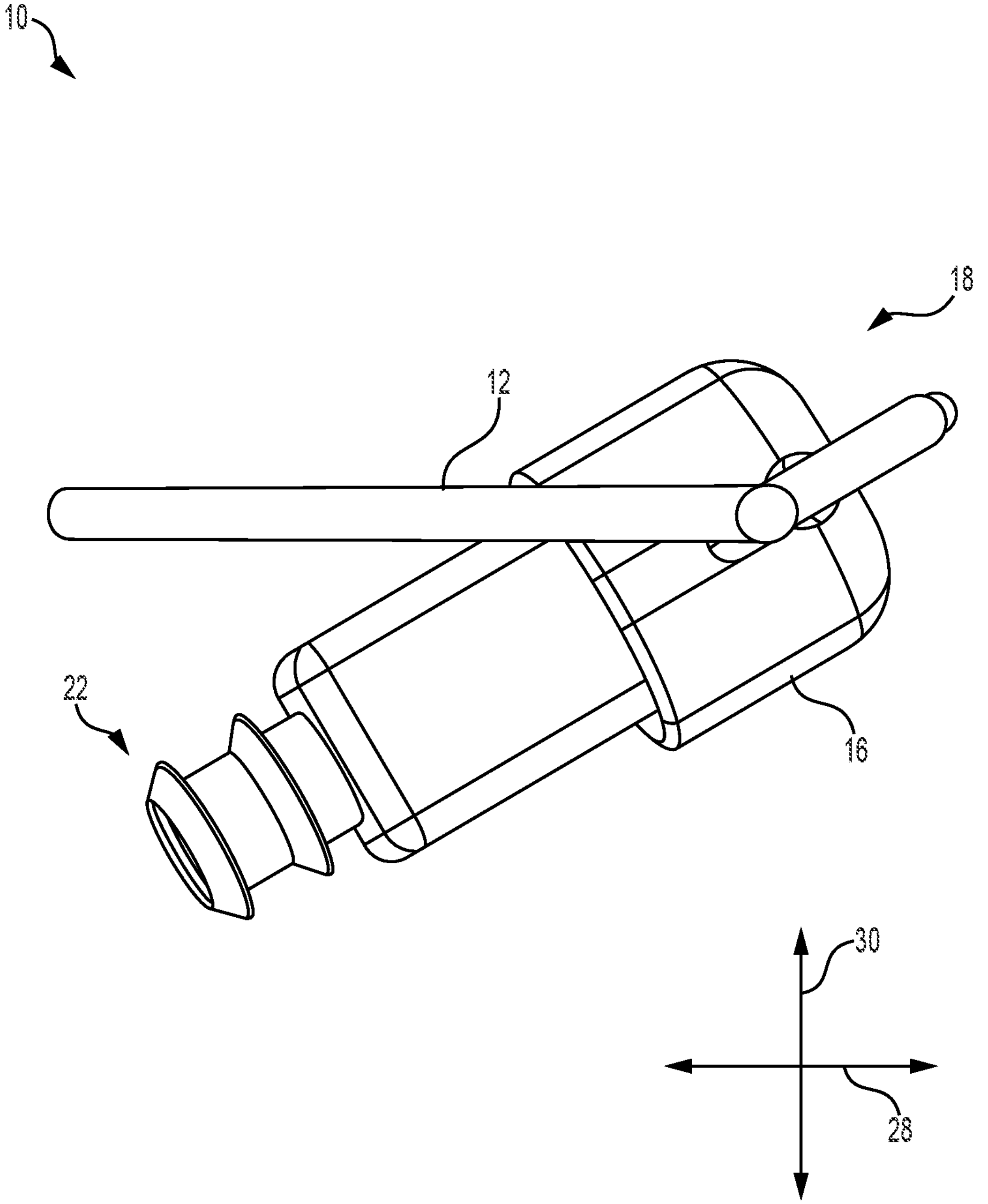
FIGS. 6-8 are top views of the twisting of an earpiece from a default orientation into an insertion orientation for insertion into an ear canal according to various example embodiments.
Figure 7:
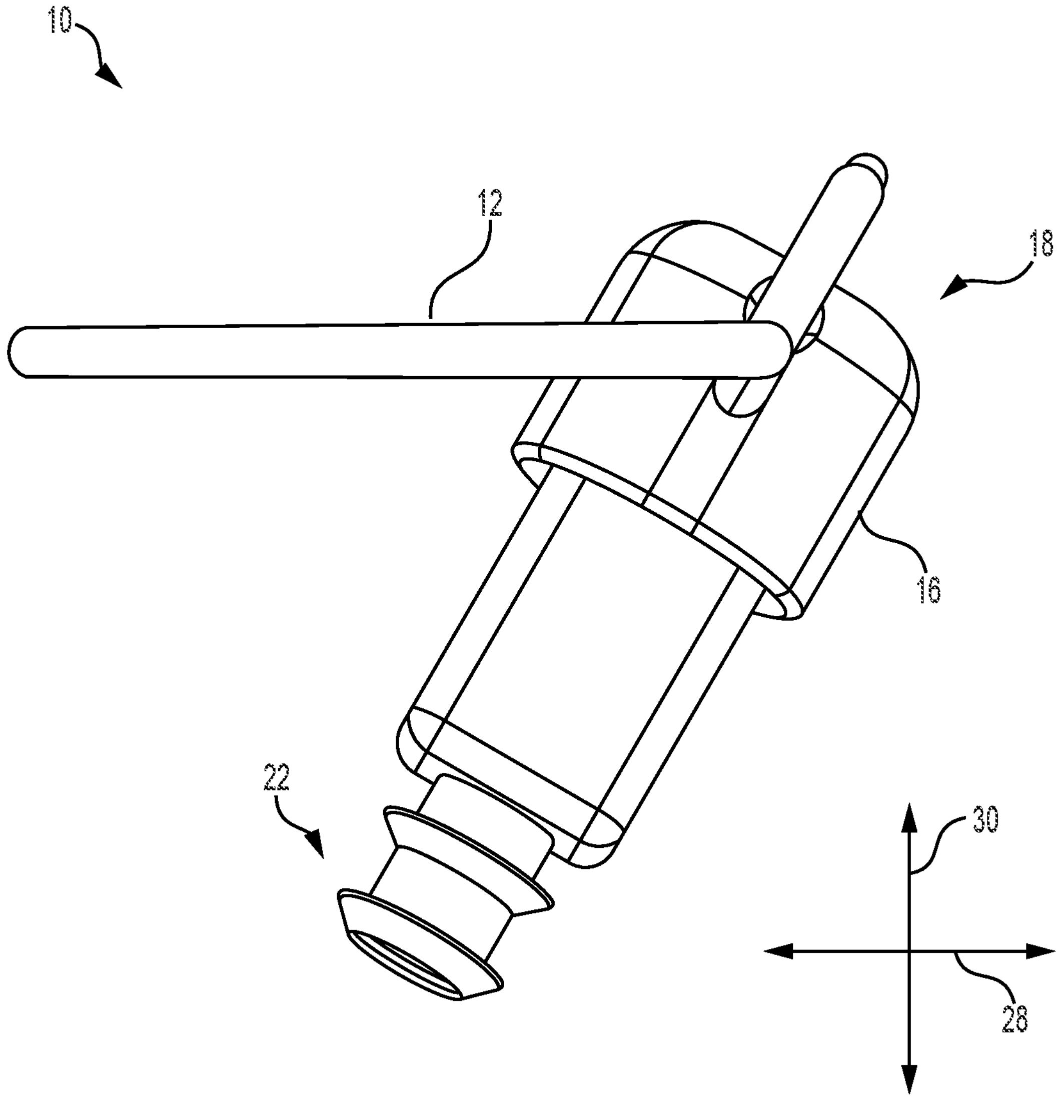

In some implementations, earpiece 16 may be configured to be twisted from the default orientation for insertion into an ear canal, thus defining an insertion orientation. Referring also to FIGS. 3-5, the twisting of earpiece 16 is shown relative to cable portion 12. In one example and as discussed above, cable portion 12 may elastically bias earpiece 16 in an orientation substantially parallel to the ear loop defined by cable portion 12/oriented toward the interior of the ear loop defined by cable portion 12 (e.g., default orientation 24). In another example, earpiece 16 may be twisted from default orientation 24 for insertion into an ear canal, thus defining insertion orientation 26. As shown in FIG. 4, insertable end 22 of earpiece 16 may be at least partially inserted into an ear canal (e.g., the ear canal of a left ear) by twisting earpiece 16 from default orientation 24 to insertion orientation 26. As will be discussed in greater detail below, insertion orientation 26 may include the orientation of earpiece 16 for insertion into a left ear and the orientation of earpiece 16 for insertion into a right ear. As such, insertion orientation 26 may refer to the orientation of earpiece 16 for insertion into the ear canal of either the left ear or the right ear within the scope of the present disclosure.

In some implementations, the biasing force between the cable portion and the non-insertion end of the earpiece may elastically bias the earpiece from the insertion orientation toward the default orientation. For example and referring again to FIG. 3, the biasing force between cable portion 12 and non-insertion end 18 of earpiece 16 may elastically bias earpiece 16 from insertion orientation 26 toward default orientation 24. In this manner, earpiece 16 may, via the elastic biasing force formed by the twisting of cable portion 12 at or about the coupling of first end 14 of cable portion 12 with non-insertion end 18 of earpiece 16, be twisted back to default orientation 24.

In some implementations, the biasing force between the cable portion and the non-insertion end of the earpiece may be configured to retain the earpiece within the ear canal when the earpiece is at least partially inserted into the ear canal. For example and referring again to FIGS. 4-5, the biasing force between first end 14 of cable portion 12 and non-insertion end 18 of earpiece 16 may elastically bias earpiece 16 from insertion orientation 26 within an ear canal toward default orientation 24. However, because of the orientation and shape of the ear canal, the biasing force between first end 14 of cable portion 12 and non-insertion end 18 of earpiece 16 may retain earpiece 16 within the ear canal when earpiece 16 is at least partially inserted into the ear canal. As shown in FIG. 4, as the biasing force between first end 14 of cable portion 12 and non-insertion end 18 of earpiece 16, earpiece 16 may gently press against the interior walls of the ear canal. In this manner, earpiece 16 may be retained within the ear canal by the elastic biasing force between cable portion 12 and earpiece 16.

In some implementations, the earpiece may be configured to be twisted from the default orientation for insertion into the ear canal of either ear. Referring again to FIGS. 4-5, earpiece 16 may be twisted from default orientation 24 for insertion into the ear canal of either a left ear (as shown in FIGS. 4-5) or a right ear. For example, while FIG. 4 shows earpiece 16 being twisted counterclockwise into the ear canal of a left ear, it will be appreciated that earpiece 16 may be twisted clockwise for insertion into the ear canal of a right ear. In this manner, because default orientation 24 is aligned with/substantially parallel to the ear loop defined by cable portion 12, earpiece 16 may be similarly twisted the opposite direction (e.g., clockwise) and experience the same elastic biasing force between first end 14 of cable portion 12 and non-insertion end 18 of earpiece 16. Accordingly, earpiece retention assembly 10 may be configured to retain earpiece 16 in either ear using the elastic biasing force created by the twisting of earpiece 16 from default orientation 24 to insertion orientation 26. As discussed above, insertion orientation 26 may refer to the orientation of earpiece 16 for insertion into an ear canal of either a left ear or a right ear.

Figure 8:
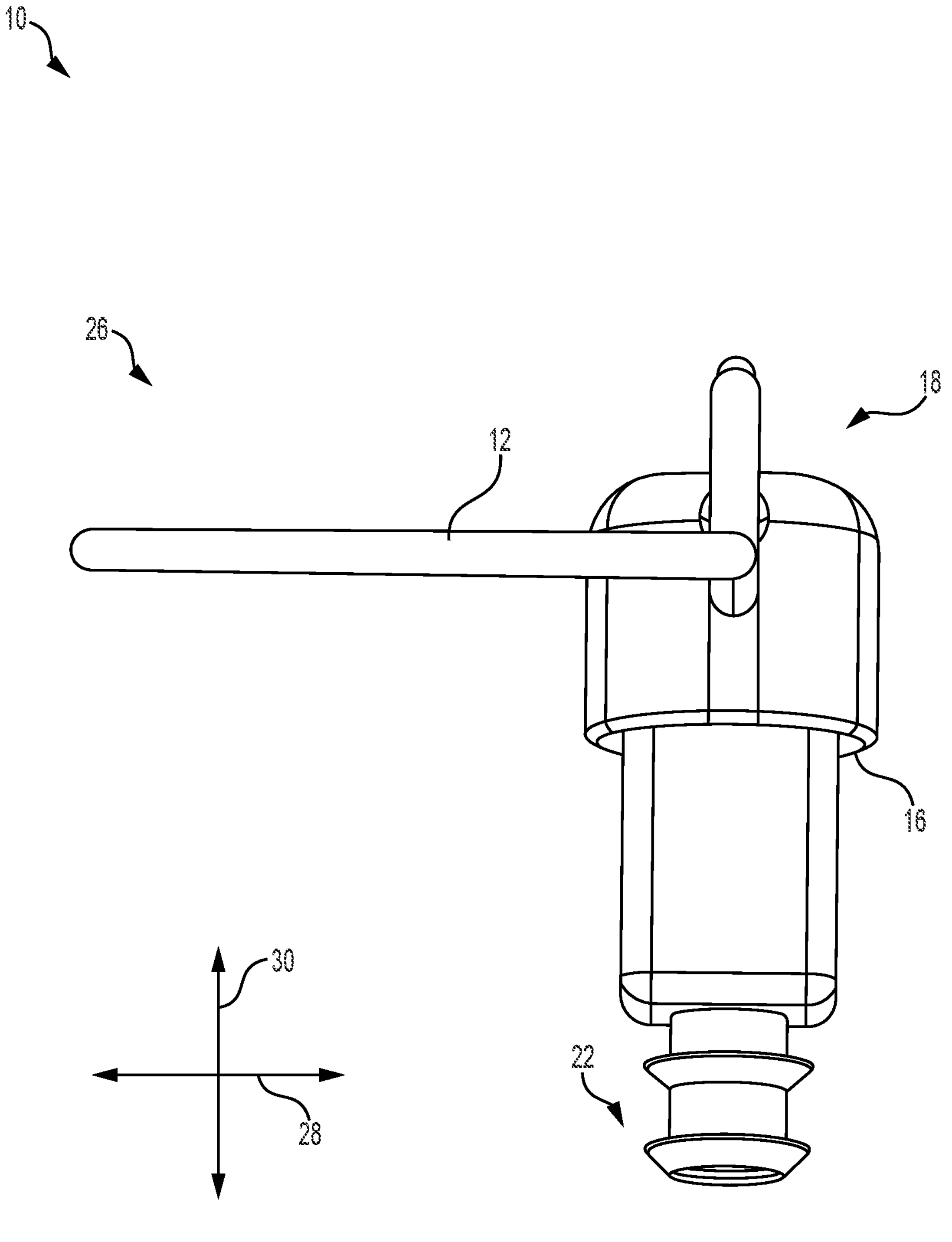
Figure 9:
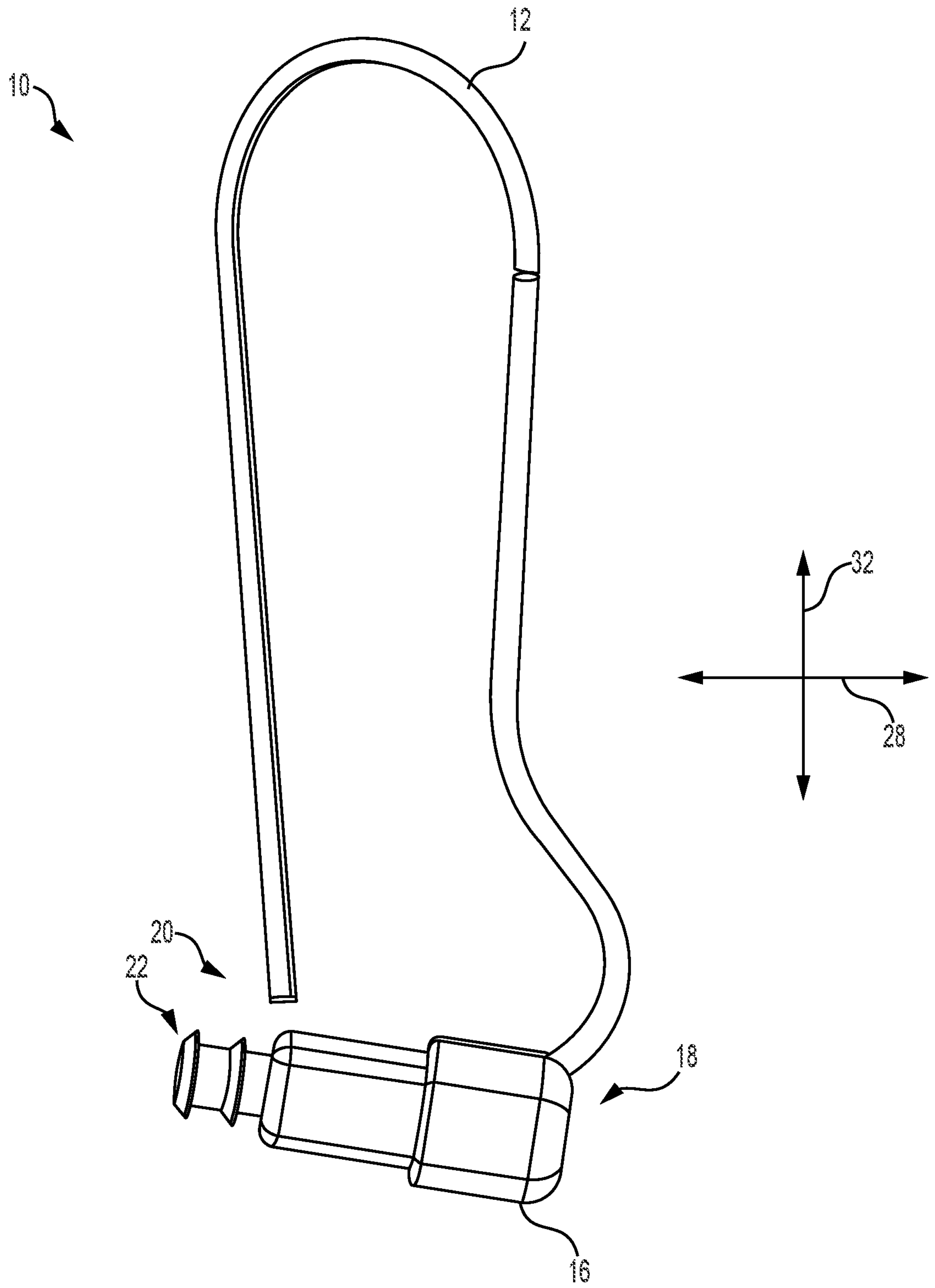
FIGS. 9-11 are perspective views of the twisting of an earpiece from a default orientation into an insertion orientation for insertion into an ear canal according to various example embodiments.
Figure 10:
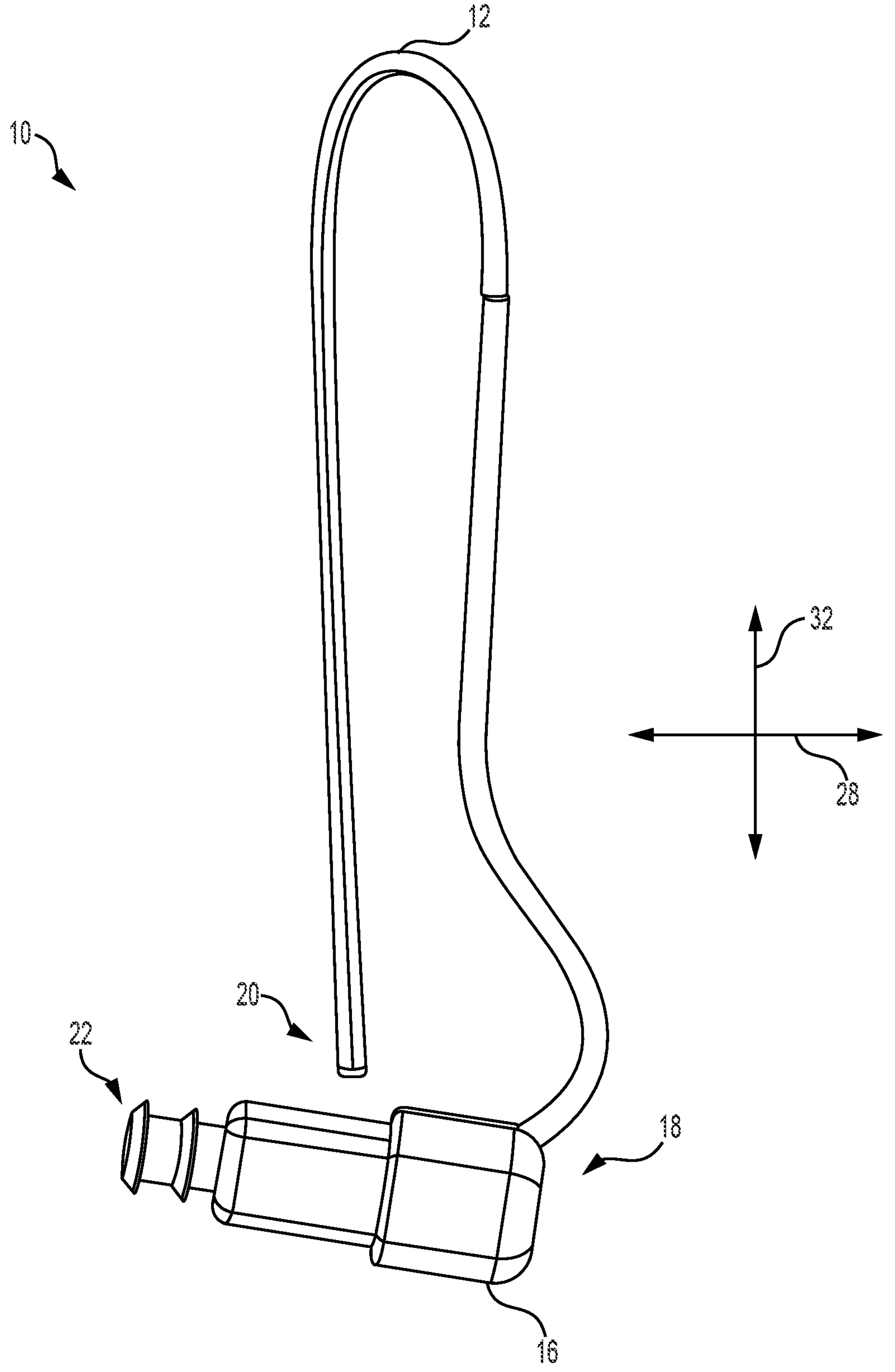
Figure 11:
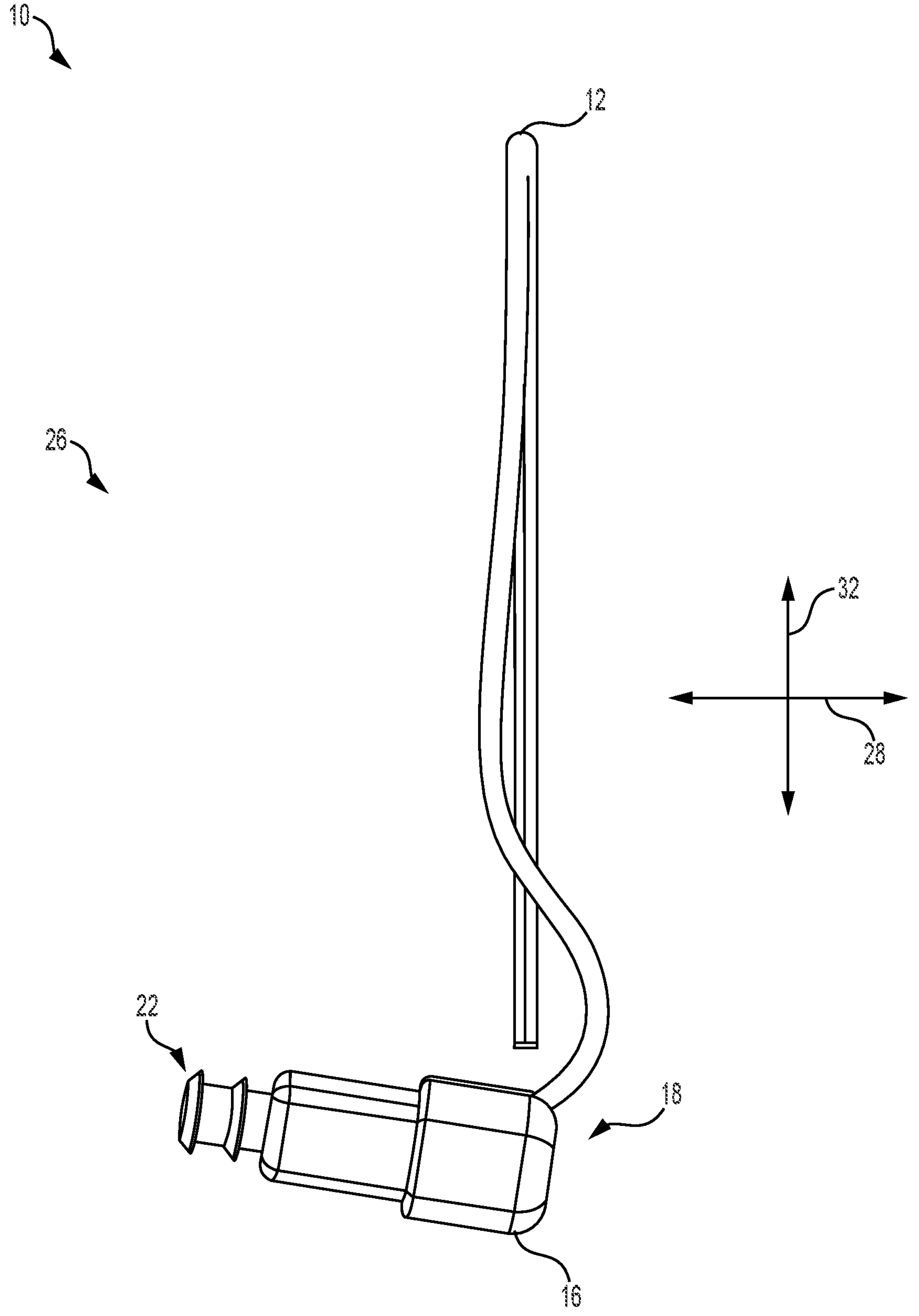
Figure 12:
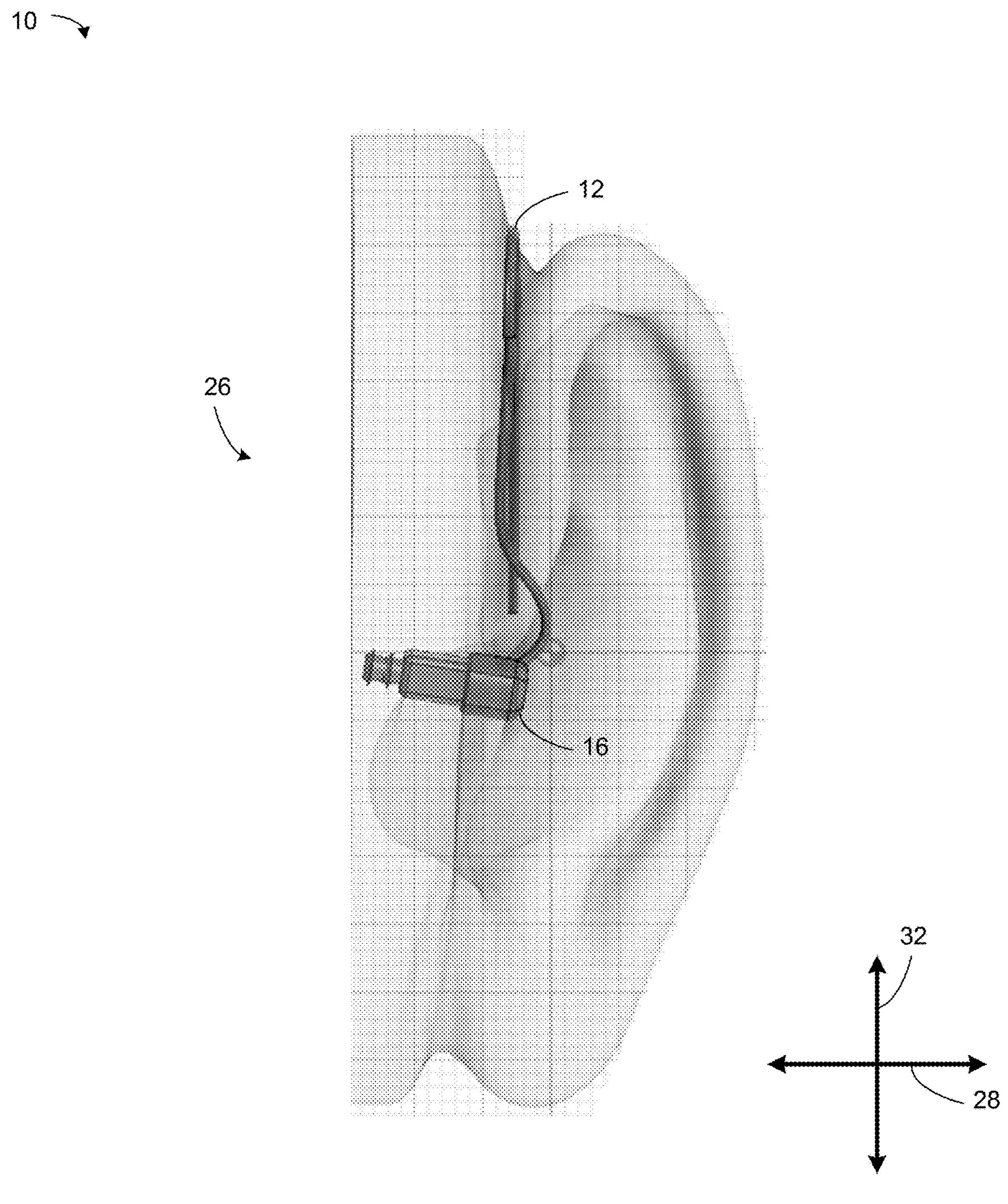
FIG. 12 is a perspective view of the earpiece retention assembly of FIG. 1 in an insertion orientation and inserted at least partially into an ear canal, according to an example embodiment.

In some implementations, the earpiece may be configured to be twisted from the default orientation to an angle ranging from zero degrees to ninety degrees relative to the default orientation when inserting the earpiece into the ear canal of a left ear. Referring again to FIG. 2 and also to FIGS. 6-11, earpiece 16 may be twisted from default orientation 24 for insertion into a left ear. For example, suppose axis 28 as shown in FIG. 2 defines default orientation 24 and axis 30 as shown in FIG. 2 defines insertion orientation 26. In this example, earpiece 16 may be twisted (e.g., by a user of earpiece retention assembly 10) at an angle ranging from about zero degrees (e.g., as shown in FIG. 2) to about ninety degrees (e.g., as shown in FIGS. 8 and 11) for insertion into a left ear. While an example of e.g., ninety degrees is provided above, it will be appreciated that earpiece 16 may be twisted at any angle relative to default orientation 24 for insertion into an ear canal of a left ear. For example, earpiece 16 may be twisted at an angle relative to the default orientation ranging from: zero degrees to ten degrees; zero degrees to twenty degrees; zero degrees to thirty degrees;

zero degrees to forty degrees; zero degrees to fifty degrees; zero degrees to sixty degrees; zero degrees to seventy degrees; zero degrees to eighty degrees; or between any two angles between zero degrees and ninety degrees. For instance, earpiece 16 may be twisted between ten degrees and ninety degrees; twenty degrees and ninety degrees; thirty degrees and ninety degrees; forty degrees and ninety degrees; fifty degrees and ninety degrees; sixty degrees and ninety degrees; seventy degrees and ninety degrees; and eighty degrees and ninety degrees. While reference has been made to angles between zero degrees and ninety degrees, it will be appreciated that earpiece 16 may be twisted beyond ninety degrees for insertion into the left ear. For example, for insertion into a user's ear canal, earpiece 16 may be twisted over ninety degrees relative to default orientation 24 depending on the user's ear. For example, earpiece 16 may be twisted at an angle relative to the default orientation ranging from: zero degrees to one hundred degrees; zero degrees to one hundred ten degrees; zero degrees to one hundred twenty degrees; zero degrees to one hundred thirty degrees; zero degrees to one hundred forty degrees; zero degrees to one hundred fifty degrees; zero degrees to one hundred sixty degrees; zero degrees to one hundred seventy degrees; zero degrees to one hundred eighty degrees; or between any two angles between zero degrees and ninety degrees. For instance, earpiece 16 may be twisted between ninety degrees to one hundred degrees; ninety degrees to one hundred ten degrees; ninety degrees to one hundred twenty degrees; ninety degrees to one hundred thirty degrees; ninety degrees to one hundred forty degrees; ninety degrees to one hundred fifty degrees; ninety degrees to one hundred sixty degrees; ninety degrees to one hundred seventy degrees; and ninety degrees to one hundred eighty degrees. In this manner, the elastic biasing force between cable portion 12 and earpiece 16 may retain earpiece 16 at least partially within or adjacent to an ear canal of a user's left ear.

In some implementations, the earpiece may be configured to be twisted from the default orientation to an angle ranging from zero degrees to negative ninety degrees relative to the default orientation for insertion into the ear canal of a right ear. As discussed above relative to the insertion of earpiece 16 into the ear canal of a left ear, earpiece 16 may be twisted (e.g., by a user of earpiece retention assembly 10) at an angle ranging from zero degrees (e.g., as shown in FIG. 2) to about negative ninety degrees. For example, earpiece 16 may be twisted at an angle relative to the default orientation ranging from: zero degrees to negative ten degrees; zero degrees to negative twenty degrees; zero degrees to negative thirty degrees; zero degrees to negative forty degrees; zero degrees to negative fifty degrees; zero degrees to negative sixty degrees; zero degrees to negative seventy degrees; zero degrees to negative eighty degrees; or between any two angles between zero degrees and negative ninety degrees. For instance, earpiece 16 may be twisted between negative ten degrees and negative ninety degrees; negative twenty degrees and negative ninety degrees; negative thirty degrees and negative ninety degrees; negative forty degrees and negative ninety degrees; negative fifty degrees and negative ninety degrees; negative sixty degrees and negative ninety degrees; negative seventy degrees and negative ninety degrees; and negative eighty degrees and negative ninety degrees. While an example of e.g., negative ninety degrees is provided above, it will be appreciated that earpiece 16 may be twisted beyond negative ninety degrees relative to default orientation 24 for insertion into an ear canal of a right ear. For example, for insertion into a user's ear canal, earpiece 16 may be twisted over ninety degrees (e.g., beyond negative ninety degrees) relative to default orientation 24. For example, earpiece 16 may be twisted at an angle relative to the default orientation ranging from: zero degrees to negative one hundred degrees; zero degrees to negative one hundred ten degrees; zero degrees to negative one hundred twenty degrees; zero degrees to negative one hundred thirty degrees; zero degrees to negative one hundred forty degrees; zero degrees to negative one hundred fifty degrees; zero degrees to negative one hundred sixty degrees; zero degrees to negative one hundred seventy degrees; and zero degrees to negative one hundred eighty degrees. In some implementations, earpiece 16 may be twisted between negative ninety degrees to negative one hundred degrees; negative ninety degrees to negative one hundred ten degrees; negative ninety degrees to negative one hundred twenty degrees; negative ninety degrees to negative one hundred thirty degrees; negative ninety degrees to negative one hundred forty degrees; negative ninety degrees to negative one hundred fifty degrees; negative ninety degrees to negative one hundred sixty degrees; negative ninety degrees to negative one hundred seventy degrees; and negative ninety degrees to negative one hundred eighty degrees. In this manner, the elastic biasing force between cable portion 12 and earpiece 16 may retain earpiece 16 at least partially within or adjacent to an ear canal of a user's right ear.

Figure 13:
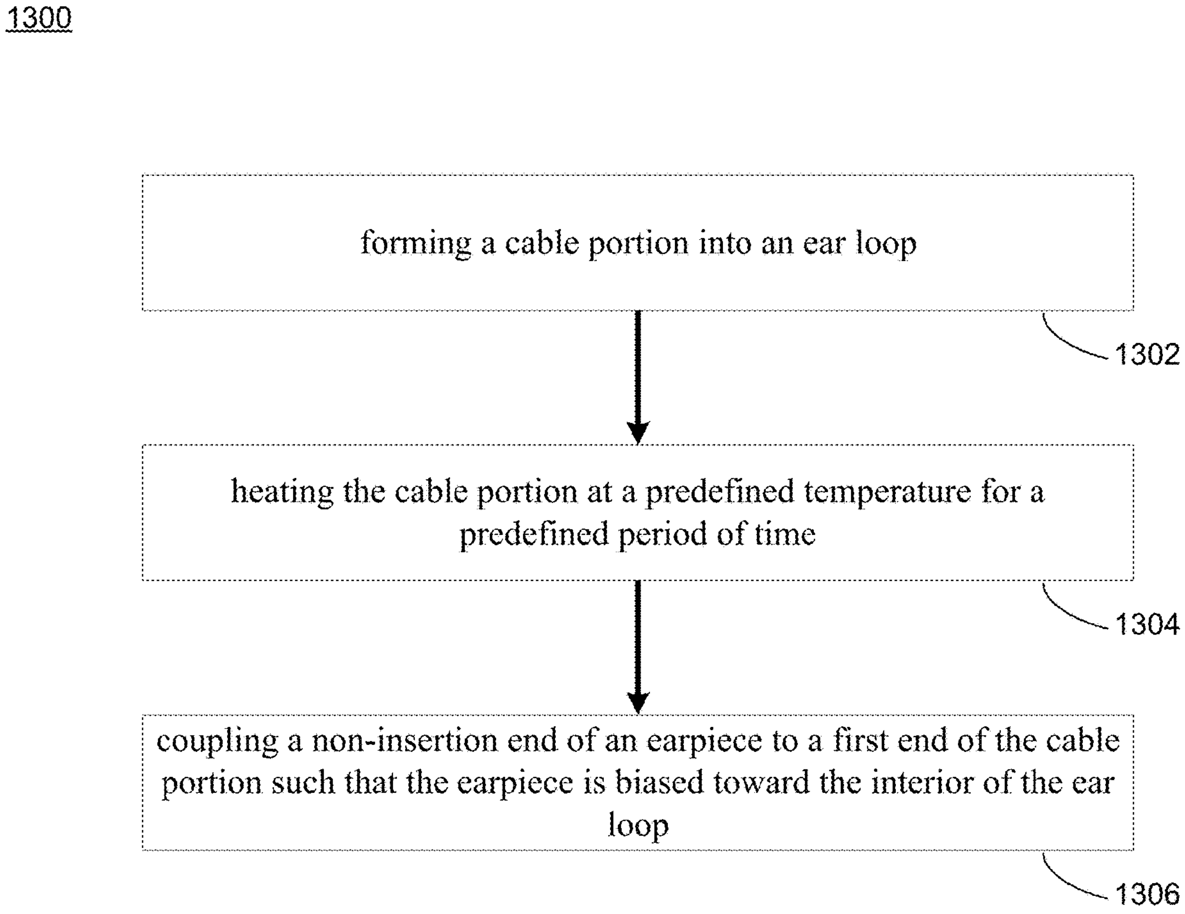
FIG. 13 is a flowchart of a method for producing an earpiece retention assembly, according to an example embodiment.

Referring also to FIG. 13 and in some implementations, a method (e.g., method 1300) for producing an earpiece retention assembly is provided. For example, the method may include forming 1302 a cable portion (e.g., cable portion 12) into an ear loop. As discussed above, forming 1302 the cable portion may include forming cable portion 12 into an ear loop or ear hook shape. In some implementations, cable portion 12 may be inserted into a mold or other mechanism configured to form or shape cable portion 12 into an ear loop.

In some implementations, the cable portion may be heated 1304 at about eighty degrees Celsius for about twenty minutes. For example, a mold or other mechanism configured to hold cable portion 12 into the shape of an ear loop may be placed in or on a heating source (e.g., an oven) set to a predefined temperature (e.g., eighty degrees Celsius) for a predefined amount of time (e.g., twenty minutes). In this manner, cable portion 12 may stiffen during the heating process such that cable portion 12 is configured to elastically bias into the ear loop shape (or whatever shape cable portion 12 is heated in). While an example temperature of e.g., eighty degrees Celsius and an example period of time of e.g., twenty minutes for heating cable portion 12 has been provided, it will be appreciated that the predefined heating temperature and predefined heating time may be selected or determined based upon, at least in part, the material of cable portion 12 and the dimensions of cable portion 12. For example, the heating temperature or set of heating temperatures and heating time or set of heating times may be selected or determined for a particular cable portion material and/or for particular dimensions of the cable portion such that cable portion 12 is imparted with elastic characteristics by the heating process.

In some implementations, the cable portion may be cooled at a predefined temperature for a predefined period of time. For example, cable portion 12 may be cooled at a controlled rate (i.e., a predefined temperature or set of temperatures for a predefined period of time) based on the properties (i.e., material, dimensions, etc.) of cable portion 12 to impart elastic characteristics. In some implementations, cable portion 12 may be placed in a cooling device configured to cool cable portion 12 at the predefined rate for the predefined amount of time.

In some implementations, a non-insertion end of an earpiece may be coupled 1306 to a first end of the cable portion such that the earpiece is oriented toward the interior of the ear loop. For example and following the heating of cable portion 12, cable portion 12 may be removed from the heating source and allowed to cool or exposed to controlled cooling. As cable portion 12 cools, first end 14 may be biased or bent toward the interior of the ear loop. In some implementations, earpiece 16 may be coupled 1306 to first end 14 of cable portion 12 such that earpiece 16 is oriented toward the interior of the ear loop formed by cable portion 12. As shown in FIG. 1, earpiece 16 may be oriented such that an insertable end (e.g., insertable end 22) of earpiece 16 is oriented toward the interior of the ear loop formed by cable portion 12.

In some implementations, coupling 1306 earpiece 16 to first end 14 of cable portion 12 such that earpiece 16 is oriented toward the interior of the ear loop formed by cable portion 12 may include coupling 1306 earpiece 16 into an orientation substantially parallel to cable portion 12 when cable portion 12 is looped over an ear, thus defining a default orientation (e.g., default orientation 24). Referring again to FIG. 2 which is a top view of earpiece retention assembly 10 as shown in FIG. 1, earpiece 16 may be coupled 1306 to first end 14 of cable portion 12 such that cable portion 12 elastically biases earpiece into an orientation substantially parallel to the top of the ear loop formed by cable portion (e.g., default orientation 24). As shown in FIGS. 1-2, cable portion 12 may define an ear loop extending along axis 26. Accordingly, earpiece 16 may be coupled 1306 to cable portion 12 such that earpiece 16 is elastically biased substantially parallel to the ear loop formed by cable portion 12 extending along axis 26. In this manner, earpiece 16 may be elastically biased in an orientation substantially parallel to the cable portion looping over an ear (i.e., parallel with the ear loop defined by cable portion 12). While FIG. 2 shows earpiece 16 exactly parallel with the ear loop formed by cable portion 12, it will be appreciated that earpiece 16 may be oriented or biased substantially parallel to the ear loop formed by cable portion 12 within the scope of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An earpiece retention assembly comprising:

a cable portion pre-formed into an ear loop that wraps around and down behind an ear with a first end coupled to a non-insertion end of an earpiece, wherein the cable portion is configured to bias the earpiece toward the interior of the ear loop and toward the back of the ear, thus defining a default orientation;

wherein the earpiece is configured to be twisted from the default orientation for insertion into an ear canal of the ear, thus defining an insertion orientation; and wherein the earpiece is configured to be twisted from the default orientation for insertion into the ear canal of either ear.

2. The earpiece retention assembly of claim 1, wherein a biasing force between the cable portion and the non-insertion end of the earpiece is configured to elastically bias the earpiece from the insertion orientation toward the default orientation.

3. The earpiece retention assembly of claim 2, wherein the biasing force between the cable portion and the non-insertion end of the earpiece is configured to retain the earpiece within the ear canal when the earpiece is at least partially inserted into the ear canal.

4. The earpiece retention assembly of claim 1, wherein the earpiece is configured to be twisted from the default orientation to an angle ranging from about zero degrees to about one hundred eighty degrees relative to the default orientation when inserting the earpiece into the ear canal of a left ear.

5. The earpiece retention assembly of claim 1, wherein the earpiece is configured to be twisted from the default orientation to an angle ranging from about zero degrees to about negative one hundred eighty degrees relative to the default orientation for insertion into the ear canal of a right ear.

6. The earpiece retention assembly of claim 1, wherein a second end of the cable portion is configured to be coupled to an electronic device.

7. The earpiece retention assembly of claim 1, wherein the cable portion includes one or more wires encased in an exterior tubing.

8. An earpiece retention assembly comprising:

a cable portion pre-formed into an ear loop that wraps around and down behind an ear with a first end coupled to a non-insertion end of an earpiece, wherein the earpiece is configured to be twisted from the default orientation for insertion into an ear canal of the ear, thus defining an insertion orientation;

wherein the cable portion is configured to elastically bias the electronic earpiece into an orientation substantially parallel to the cable portion oriented toward the back of the ear when the cable portion is looped over an ear, thus defining a default orientation; and wherein the earpiece is configured to be twisted from the default orientation for insertion into the ear canal of either ear.

9. The earpiece retention assembly of claim 8, wherein an elastic biasing force between the cable portion and the non-insertion end of the electronic earpiece is configured to elastically bias the electronic earpiece from the insertion orientation toward the default orientation.

10. The earpiece retention assembly of claim 9, wherein the elastic biasing force between the cable portion and the non-insertion end of the electronic earpiece is configured to retain the electronic earpiece within the ear canal when the electronic earpiece is at least partially inserted into the ear canal.

11. The earpiece retention assembly of claim 8, wherein the electronic earpiece is configured to be twisted from the default orientation to an angle ranging from about zero degrees to about one hundred eighty degrees relative to the default orientation when inserting the earpiece into the ear canal of a left ear.

12. The earpiece retention assembly of claim 8, wherein the electronic earpiece is configured to be twisted from the default orientation to an angle ranging from about zero degrees to about negative one hundred eighty degrees relative to the default orientation for insertion into the ear canal of a right ear.

13. The earpiece retention assembly of claim 8, wherein a second end of the cable portion is configured to be coupled to an electronic device.

14. The earpiece retention assembly of claim 8, wherein the cable portion includes one or more wires encased in an exterior tubing.

15. A method for producing an earpiece retention assembly comprising:

forming a cable portion into an ear loop;

heating the cable portion at a predefined temperature for a predefined period of time; and coupling a non-insertion end of an earpiece to a first end of the cable portion such that the earpiece is elastically biased toward the interior of the ear loop and toward the back of an ear.

16. The method of claim 15, wherein the cable portion includes one or more wires encased in an exterior tubing.

* * * * *